United States Patent
Piazza

(10) Patent No.: US 9,585,517 B1
(45) Date of Patent: *Mar. 7, 2017

(54) SEAFOOD BOILER APPARATUS

(71) Applicant: Sal Piazza, Kenner, LA (US)

(72) Inventor: Sal Piazza, Kenner, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/564,278

(22) Filed: Dec. 9, 2014

Related U.S. Application Data

(63) Continuation of application No. 13/100,402, filed on May 4, 2011, now Pat. No. 8,904,924.

(60) Provisional application No. 61/330,984, filed on May 4, 2010.

(51) Int. Cl.
*A47J 37/12* (2006.01)
*A47J 36/18* (2006.01)

(52) U.S. Cl.
CPC .......... *A47J 36/18* (2013.01); *A47J 37/1219* (2013.01); *A47J 37/1295* (2013.01)

(58) Field of Classification Search
CPC .. A47J 37/044; A47J 37/1219; A47J 37/1295; A47J 36/14; A47J 27/004; G07F 9/105; A21B 5/08; A23N 15/08
USPC ......... 99/355, 356, 407, 409, 410, 416, 516; 219/430, 439
See application file for complete search history.

(56) References Cited

U.S. PATENT DOCUMENTS

| | | | | |
|---|---|---|---|---|
| 4,450,757 A * | 5/1984 | Alfio | A47J 27/18 | 126/374.1 |
| 4,505,193 A * | 3/1985 | Mariotti | A47J 37/1228 | 426/438 |
| 4,685,386 A * | 8/1987 | Bezon | A47J 27/18 | 99/404 |
| 4,719,850 A * | 1/1988 | Sowell | A47J 37/1214 | 99/404 |
| 4,979,864 A * | 12/1990 | Cahlander | B65G 65/23 | 414/420 |
| 5,347,917 A * | 9/1994 | Vezzani | A47J 27/18 | 99/335 |
| 5,782,170 A * | 7/1998 | Pomara, Jr. | A47J 37/1228 | 426/438 |
| 5,918,535 A * | 7/1999 | Moreau | A47J 36/20 | 294/26 |
| 5,970,853 A * | 10/1999 | Marszalek | A47J 37/1219 | 99/403 |
| 6,322,831 B1 * | 11/2001 | Mote | A47J 37/1219 | 426/231 |
| 6,820,536 B2 * | 11/2004 | Kijimoto | A47J 37/128 | 99/330 |
| 8,904,924 B1 * | 12/2014 | Piazza | A47J 37/1219 | 99/407 |
| 2006/0021521 A1 * | 2/2006 | Cutrer | A23L 1/0121 | 99/516 |
| 2007/0087110 A1 * | 4/2007 | Pilla | A23L 1/217 | 426/637 |

* cited by examiner

*Primary Examiner* — Quang D Thanh
*Assistant Examiner* — Hemant Mathew
(74) *Attorney, Agent, or Firm* — Garvey, Smith, Nehrbass & North LLC; Brett A. North

(57) ABSTRACT

A cooking apparatus provides a frame for supporting a pot or cooking vessel. A basket is sized a shaped to fit the interior of the pot or cooking vessel. The pot is movable from a cooking position to intermediate draining position to a discharge position. In the discharge position, a pot lid is receptive of food articles that had been cooked. The lid is preferably pivotally attached to the frame and/or cooking vessel.

15 Claims, 12 Drawing Sheets

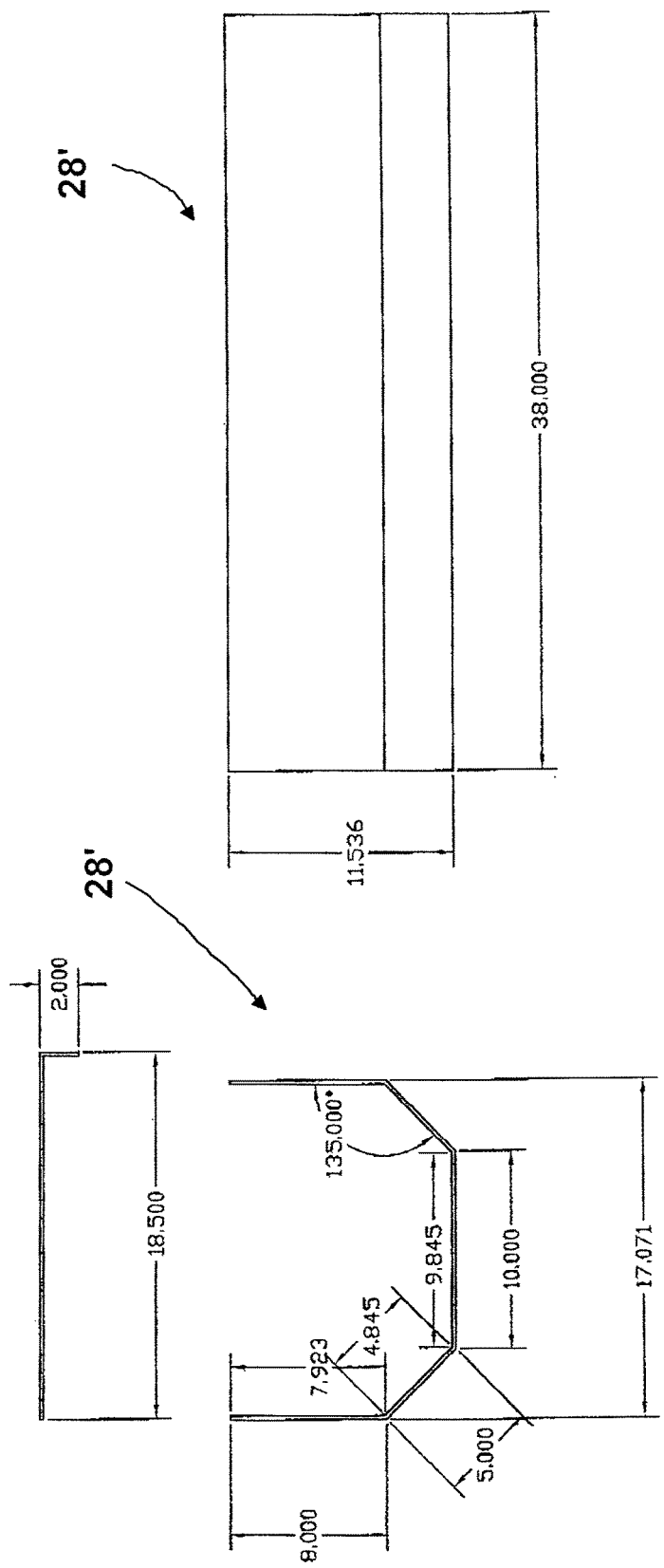

SEAFOOD BOILER APPARATUS

CROSS-REFERENCE TO RELATED APPLICATIONS

This is a continuation of U.S. patent application Ser. No. 13/100,402, filed May 4, 2011 (issued as U.S. Pat. No. 8,904,924 on Dec. 9, 2014), which is a non-provisional of U.S. Provisional Patent Application Ser. No. 61/330,984, filed May 4, 2010, which is incorporated herein by reference and priority of which is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to cooking devices, more particularly cooking devices that are used to boil seafood items such as crabs, shrimp, crawfish, and the like. Even more particularly, the present invention relates to an improved seafood boiler apparatus having a specially configured basket that is shaped to fit a pot interior, and wherein the basket can be pivoted relative to the pot or lifted from the pot using handles that extend laterally from the upper end portion of the basket, the pot having a lid that pivots to an unloading position wherein contents of the basket are discharged to the lid.

2. General Background of the Invention

Many seafood items are cooked by boiling them in a seasoned liquid. It has been known to boil crabs, shrimp and other crustacea by containing the crustacea in a perforated basket which fits inside a pot. One of the problems associated with boiling seafood is the safe removal of the seafood from the pot after cooking is completed. Prior art systems employ pots that must be lifted vertically. The steam from the cooking medium presents a hazard to the hands of a user when the user attempts to remove the basket and the contained crustacea from the cooking pot. Further, crustacea typically retain a good bit of liquid of the cooking medium which can drip upon the users or other areas outside the pot.

BRIEF SUMMARY OF THE INVENTION

The present invention provides a seafood boiling apparatus that employs a frame. The frame includes a cooking vessel having an interior that enables a fluid cooking medium to be contained and heated.

One or more burners are mounted on the frame that enable heat transfer to the cooking vessel and the contained cooking medium.

A basket is configured to fit the cooking vessel interior.

A pivotal connection is formed between the basket and the frame that enables the basket to be pivoted relative to the frame between cooking and food discharge position.

A lid is attached the frame and movable from a cooking position that covers the cooking vessel and the basket and a food discharge position that places the lid generally horizontally or slightly inclined so that food items discharged from the basket are discharged upon the lid when in the food discharge position.

The basket preferably discharges contain food items upon the lid when the lid is in the open or food discharge position and the basket is rotated from the cooking position to its food discharge position.

In one embodiment, the basket can be removed from the frame by lifting vertically wherein the basket disconnects from the pivotal connection.

In one embodiment, a mechanism locks the basket in an intermediate draining position wherein the basket is placed above the cooking medium and wherein the contents are retained within the basket.

In one embodiment, the cooking vessel has a curved wall.

In one embodiment, the basket has a peripherical rod and the rod forms a pivotal connection with the frame.

In one embodiment, the frame has multiple slots and the peripheral rod nests in the slots.

In one embodiment, the lid has a containment wall or walls that contain food items on the lid when the lid is in the open or food discharge position.

In one embodiment, there are multiple burners mounted on the frame, each positioned directly under the vessel.

In one embodiment, the burners are supplied fuel via a common manifold.

In one embodiment, the lid includes a large planer section and a smaller planar section connected to the larger planar section.

In one embodiment, the small or smaller planar sections pivotally attaches the lid to the frame.

In one embodiment, the peripheral rod forms one or more basket handles and enables the basket to be lifted vertically.

In one embodiment, the peripheral rod forms one or more handles that enable the basket to be pivoted.

In one embodiment, the lid has containment walls that contain food items on the lid when in the food discharge position, each containment wall surrounded by a basket handle when the lid is in the cooking or closed position.

In one embodiment, the lid has a pair of containment walls that are opposite one another, the containment walls retaining food items on the lid when in the food discharge position, each containment wall being generally surrounded by a basket handle when the lid is in the closed or cooking position.

In one embodiment, the lid has lid edges, one of the lid edges attaching to the frame with a pivotal connection, and a pair of the lid edges having a containment wall attached thereto.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIGS. 11-15 show an alternative pot/cooking vessel with lid where the cooking vessel has a plurality of planer sides (in this case five side) instead of a curved bottom.

DETAILED DESCRIPTION OF THE INVENTION

Figure 1:
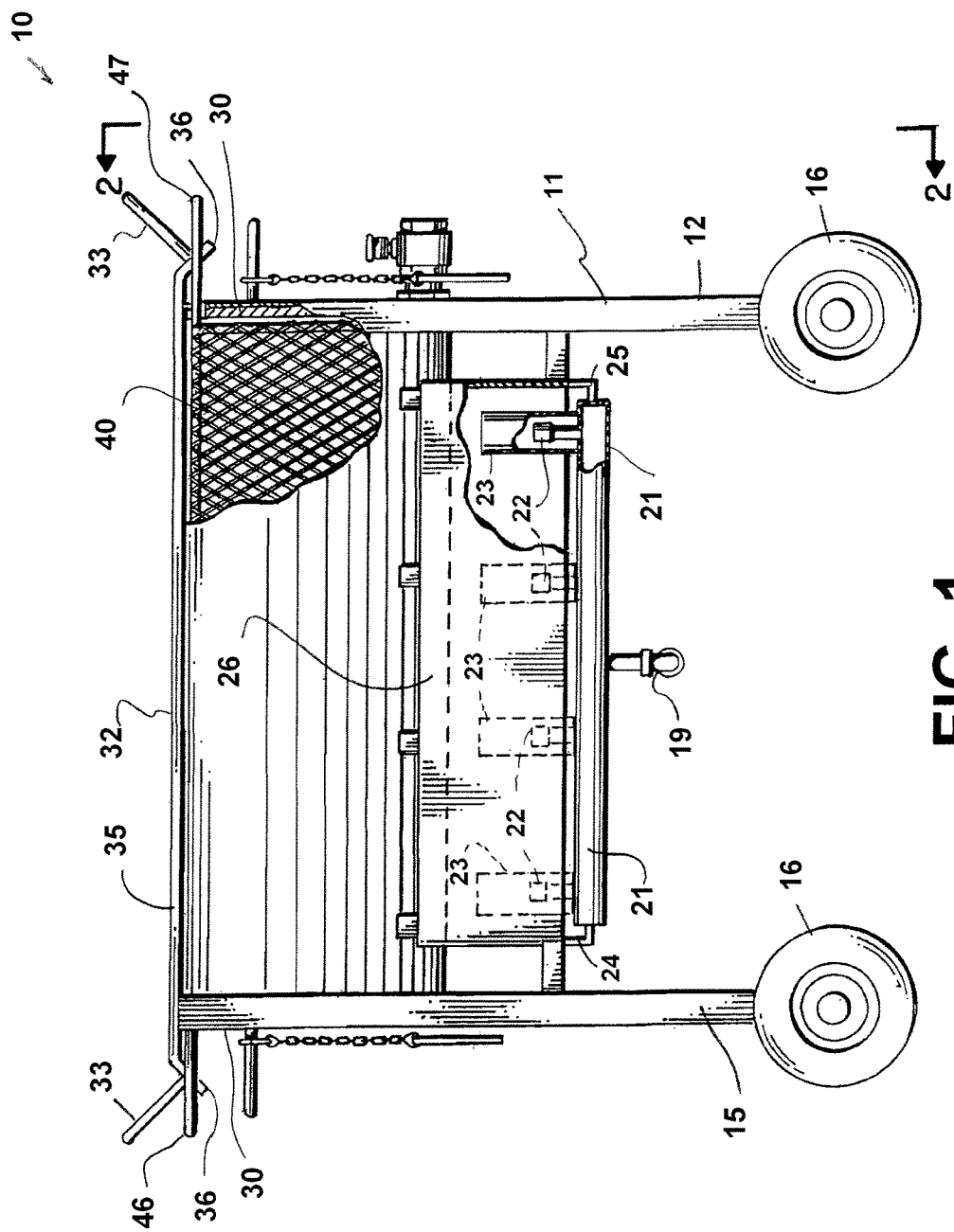
FIG. 1 is a front cutaway view of one embodiment of a seafood boiler showing internal basket and one of the four burners.
Figure 2:
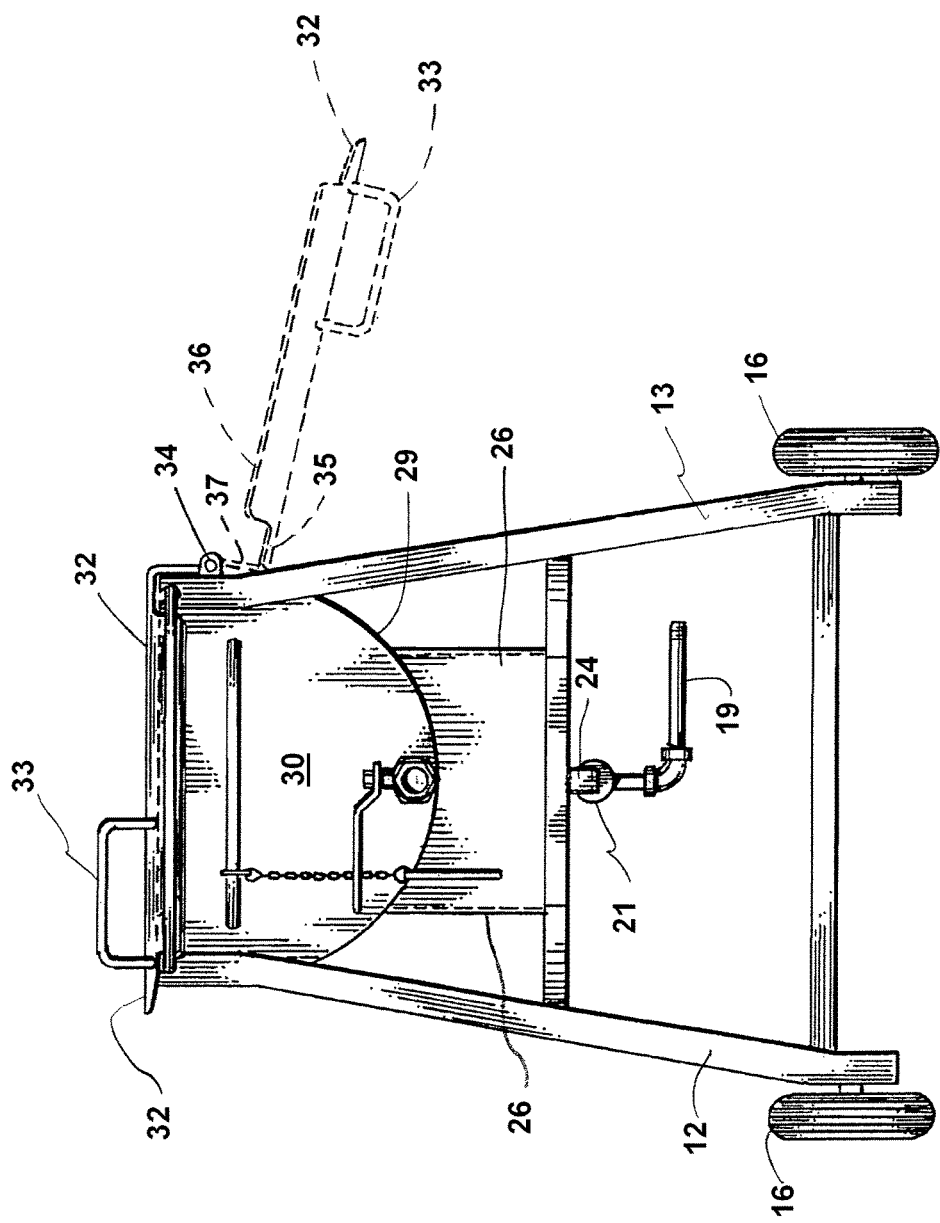
FIG. 2 is a side view of the boiler of FIG. 1.
Figure 3:
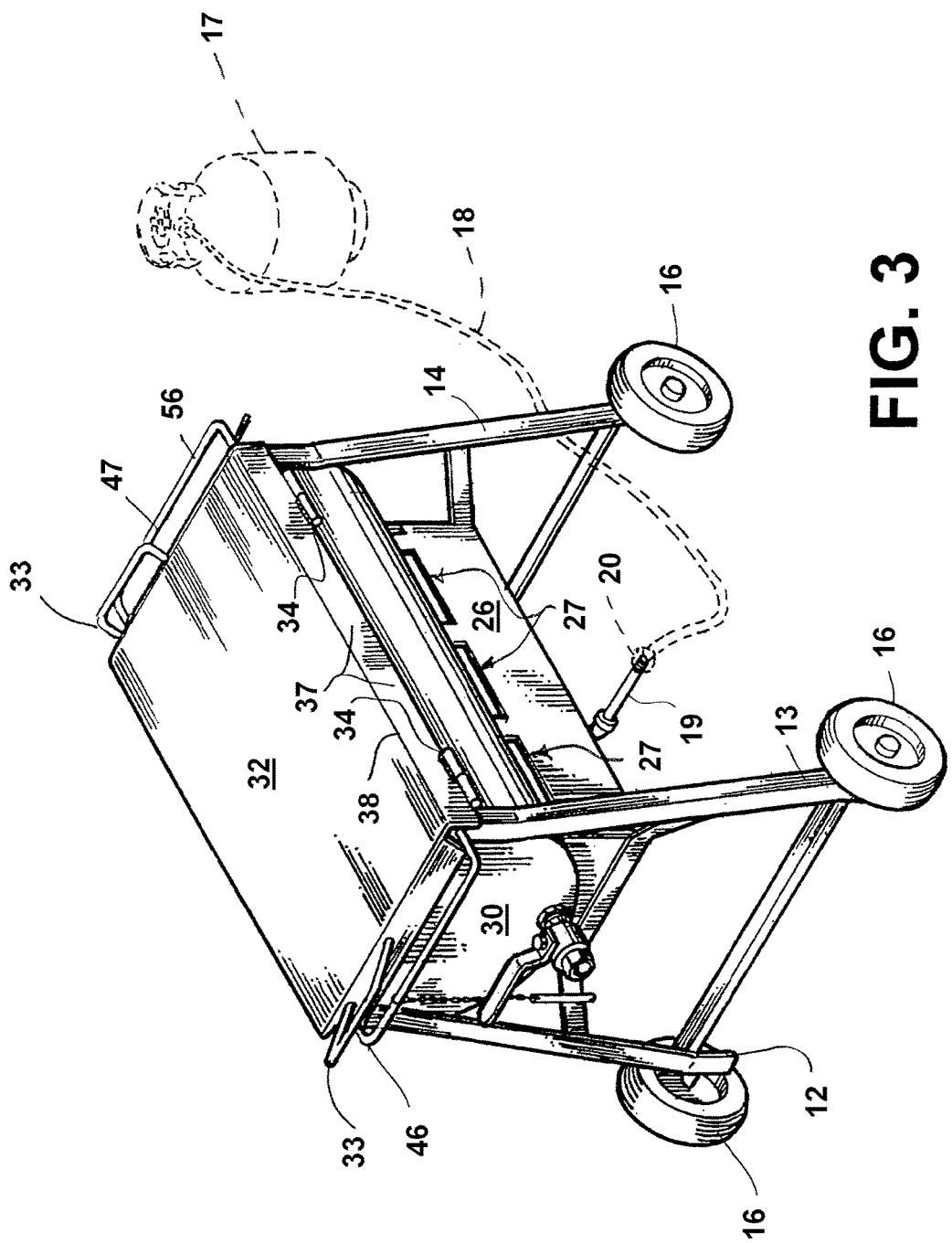
FIG. 3 is an overall perspective view of the boiler of FIG. 1 with the lid in a closed state.

FIGS. 1-10 show of the preferred embodiment of the apparatus of the present invention designated generally by the numeral 10. Cooking apparatus 10 provides a frame 11. The frame 11 can include a plurality of legs such a legs 12, 13, 14, 15. The frame 11 is preferable wheeled. In that regard, each leg 12, 13, 14, 15 is provided with a wheel 16.

A fuel supply such as a propane or butane cylinder or canister is provided. Fuel supply 17 transmits fuel via conduit or hose 18 to a flow line 19. A coupling 20 can be provided for connecting conduit or hose 18 to flow line 19.

The flow line 19 communicates with a manifold 21. Manifold 21 carries fuel from hose or conduit 18 to flow line 19 and then to a plurality of burner elements 22. Each of the burner elements can be in the form of a suitable fitting such as a nozzle or jet (commercially available), surrounded by a vertically position tube 23. Mounting brackets 24, 25 can be used to support manifold 21 and the burner elements 22 in tubes 23.

A heat shield 26 surrounds the burner elements 22 as shown. Heat shield 26 can be provided with a plurality of vent openings 27. Frame 11 supports a pot or cooking vessel 28. The pot or cooking vessel 28 has a curved wall 29 and a pair of generally semi circular end walls 30. Each of the burner elements 22 generates a flame 31 that transfers heat to pot or cooking vessel 28 by transferring heat to curved wall 29 and then to the cooking medium 43 contained within pot or cooking vessel 28.

A cover or lid 32 is provided for covering the pot or cooking vessel 28 during cooking. Cover or lid 32 has one or more handles 33. Hinges 34 are provided for forming a pivoting connection of cover/lid 32 to pot or cooking vessel 28. The lid is movable between a closed or cooking position (see FIGS. 1, 3, 5) and an open or food discharge position (see FIGS. 4, 6, 7). Cover or lid 32 includes a large planar section 35 and a smaller planar section 37. The planar sections 35, 37 are connected to form a generally right or 90 degree angle.

Figure 4:
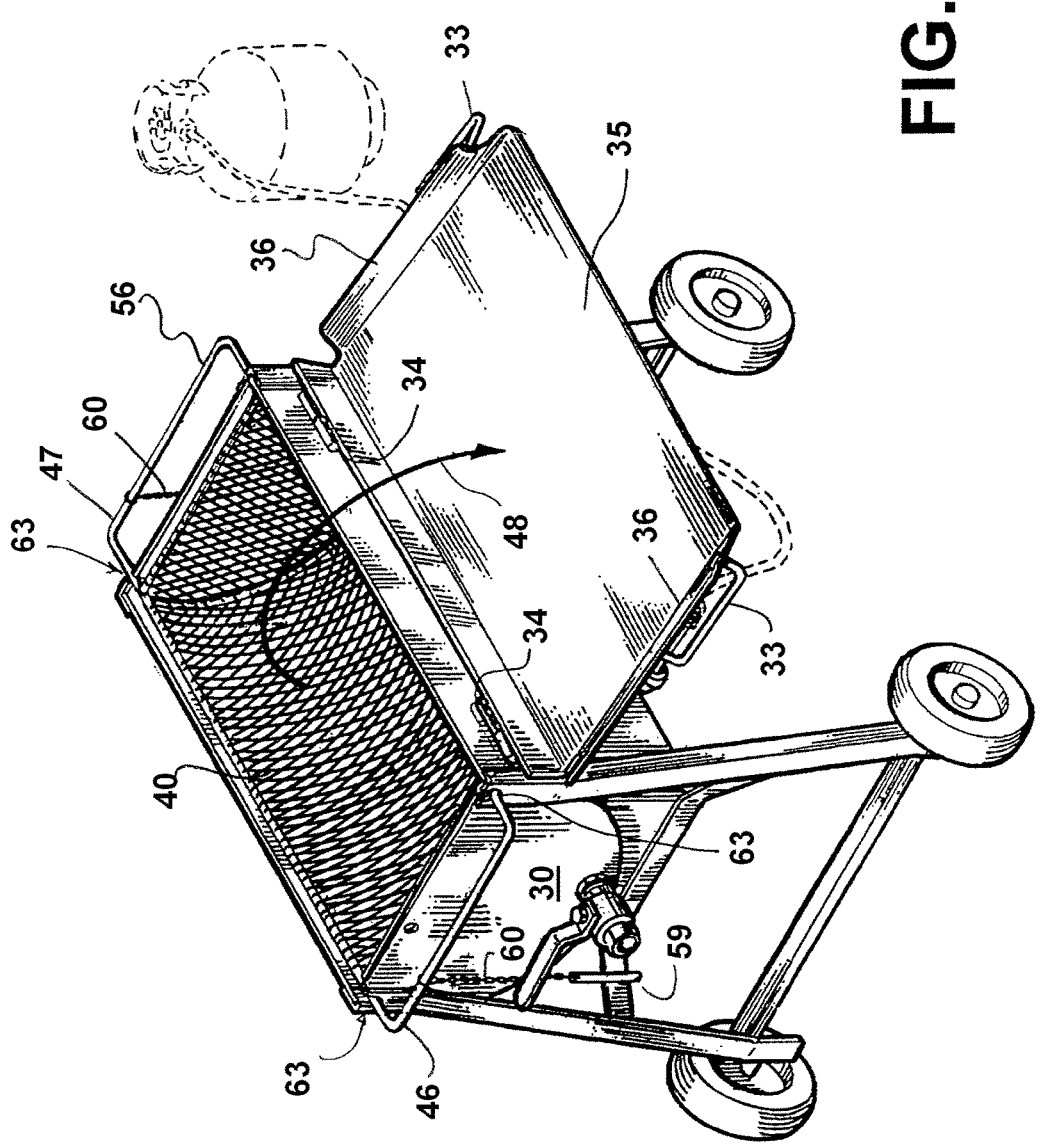
FIG. 4 is an overall perspective view of the boiler of FIG. 1 with the lid in an open state.
Figure 5:
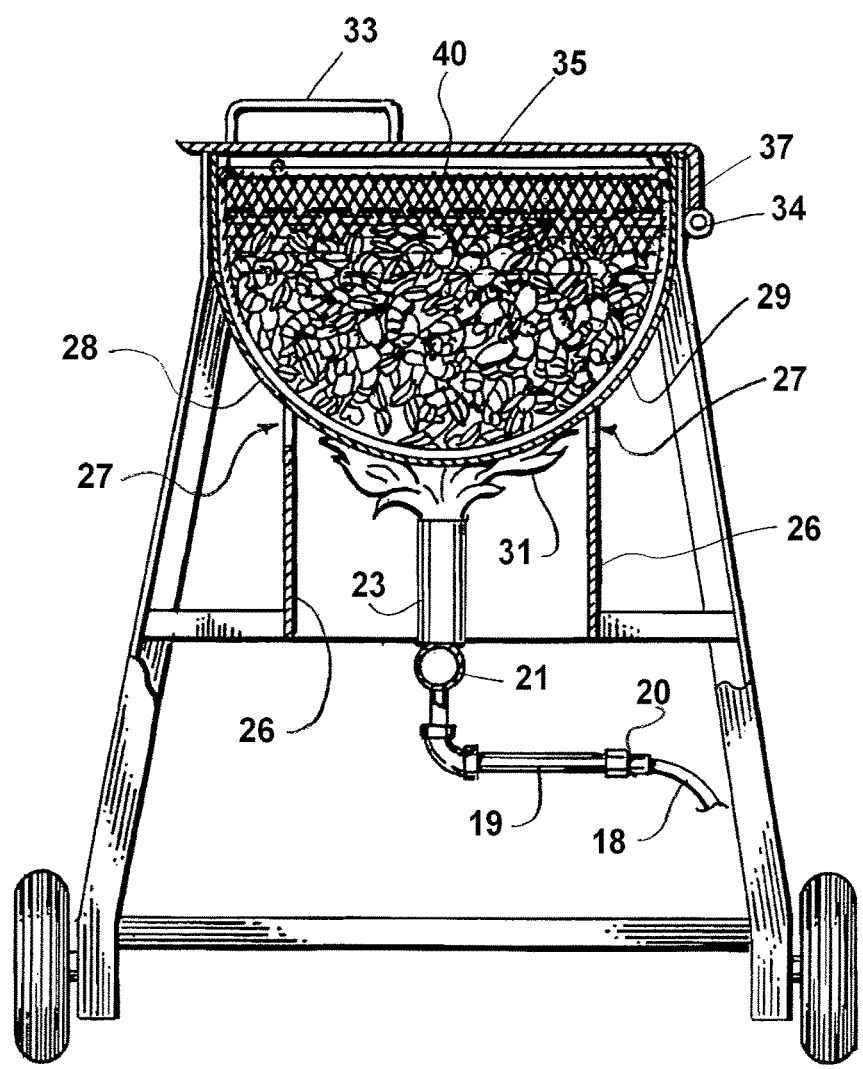
FIG. 5 is a sectional side view of the boiler of FIG. 1 showing seafood in the process of being boiled.
Figure 7:
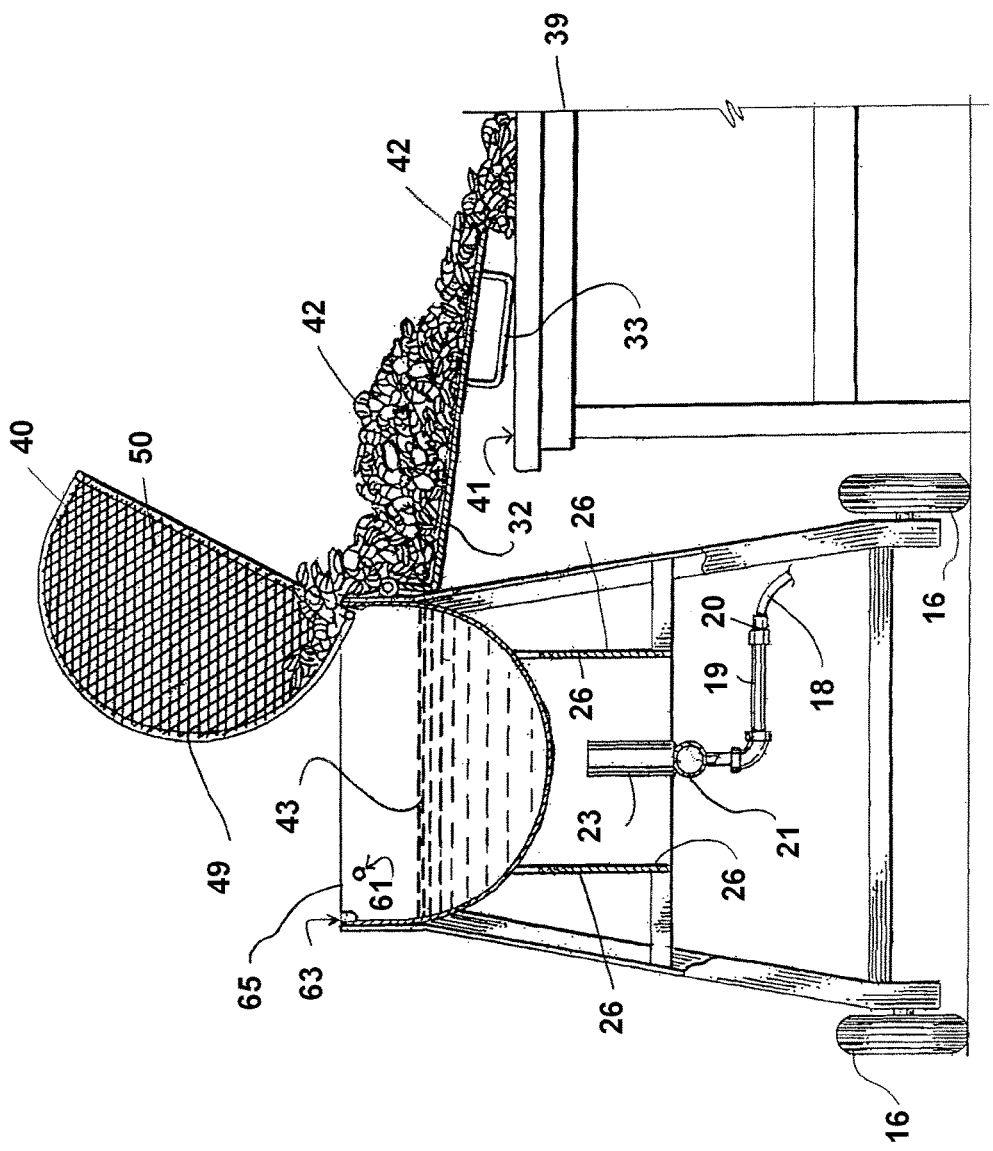
FIG. 7 is a sectional side view of the boiler of FIG. 1 showing seafood in the process of being unloaded from the basket, onto the angled cover, and being delivered on an eating surface.

One or more retaining walls 36 extend from larger planar section 35. These retaining walls 36 help to retain food items such as crustacea on cover or lid 32 when basket 40 is pivoted to a dumping position as shown in FIGS. 4 and 7. Larger planar section 35 and smaller planar section 37 are joined at edge 38. Edge 38 can be simply a bend in cover or lid 32 or can be a welded connection.

After food items are cooked in pot or cooking vessel 28 and basket 40, the basket 40 is rotated to the open or food discharge position shown in FIG. 7 so that the food items 42 such as crabs, shrimp, etc. are discharged from basket 40 to cover or lid 32. The cover or lid 32 can be supported by a table 39 having upper surface 41 as shown in FIG. 7.

Figure 8:
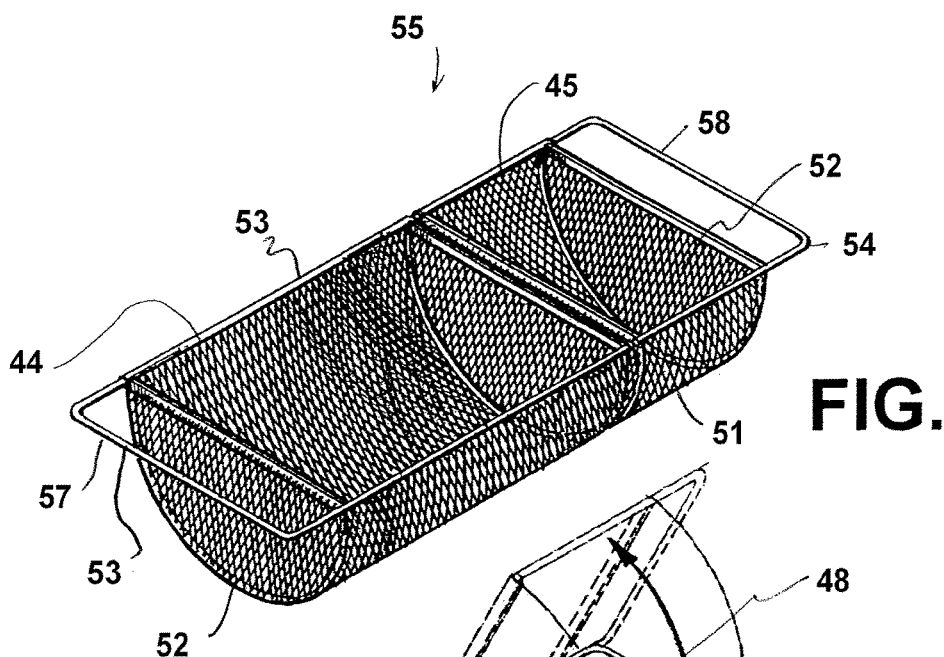
FIG. 8 is a perspective view of an alternative two basket arrangement (with large and small baskets)
Figure 9:
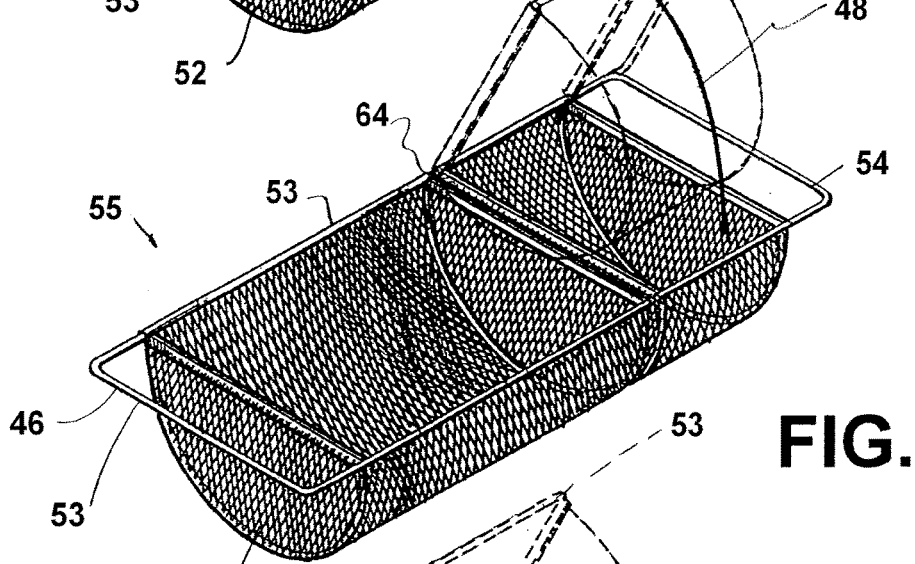
FIG. 9 is a perspective view of the two basket arrangement of FIG. 8 showing in dashed lines the small basket being raised.
Figure 10:
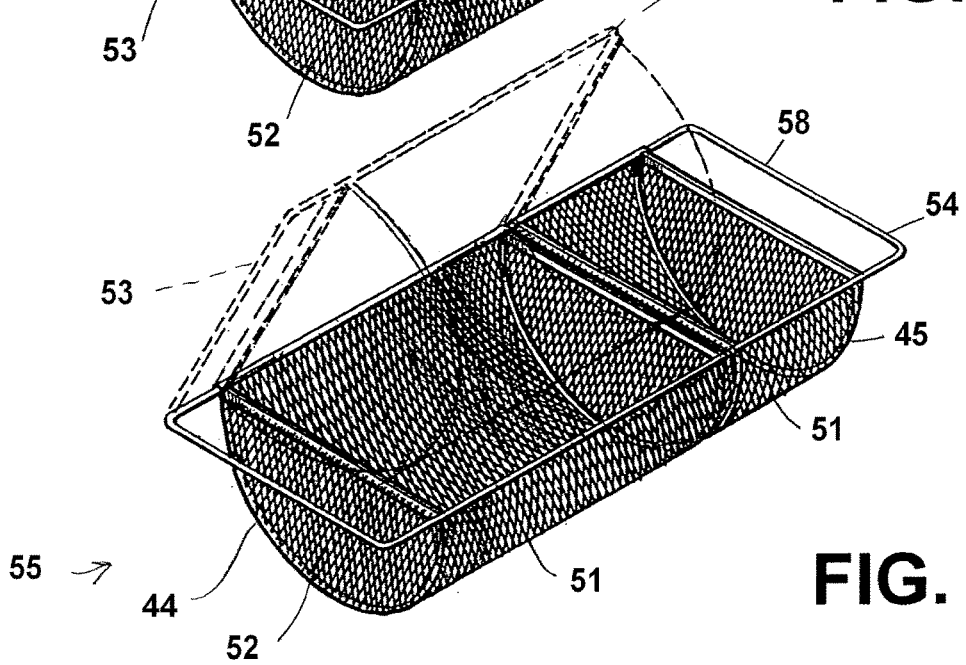
FIG. 10 is a perspective view of the two basket arrangement of FIG. 8 showing in dashed lines the large basket being raised.
Figure 11:
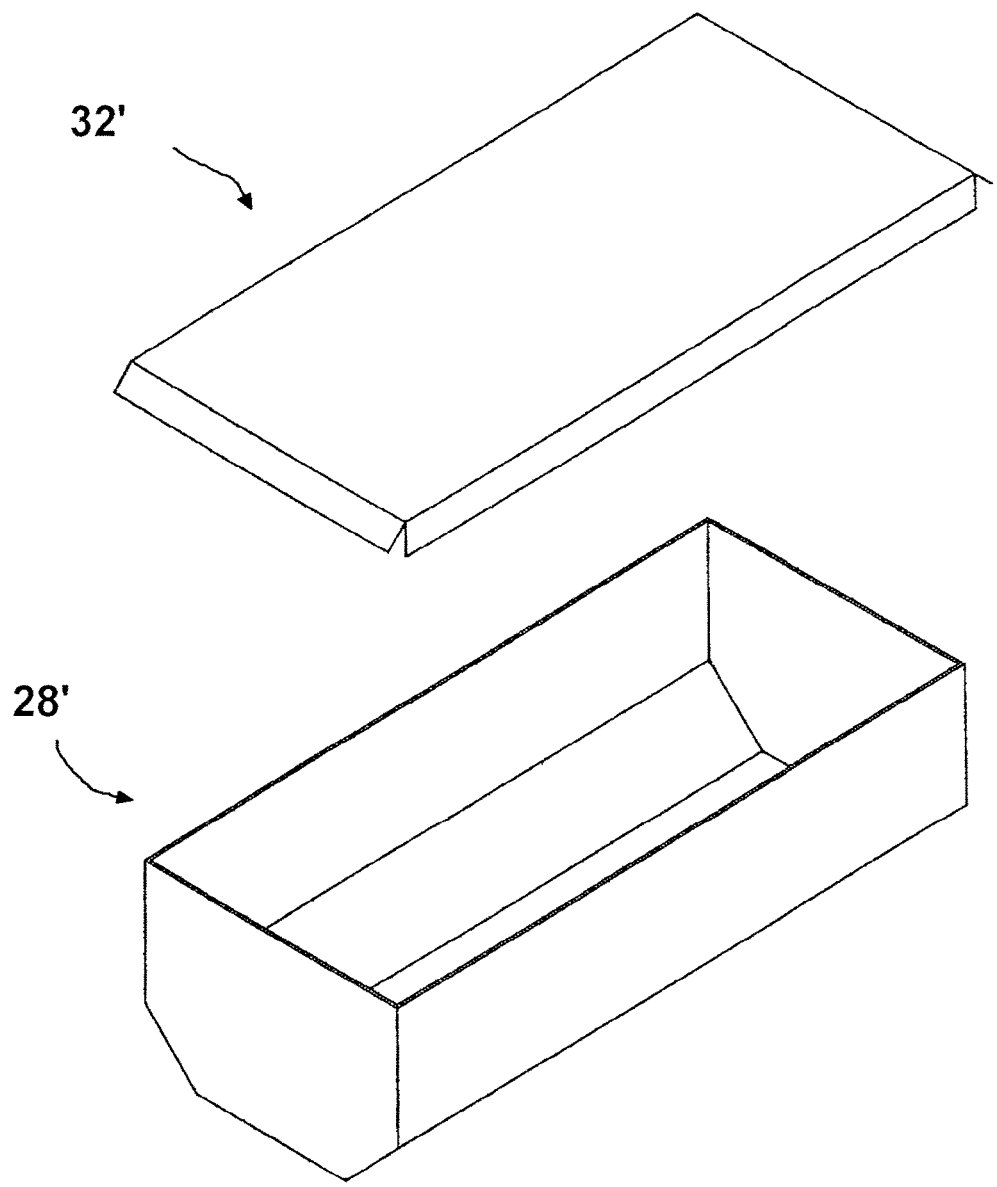
Figure 12:
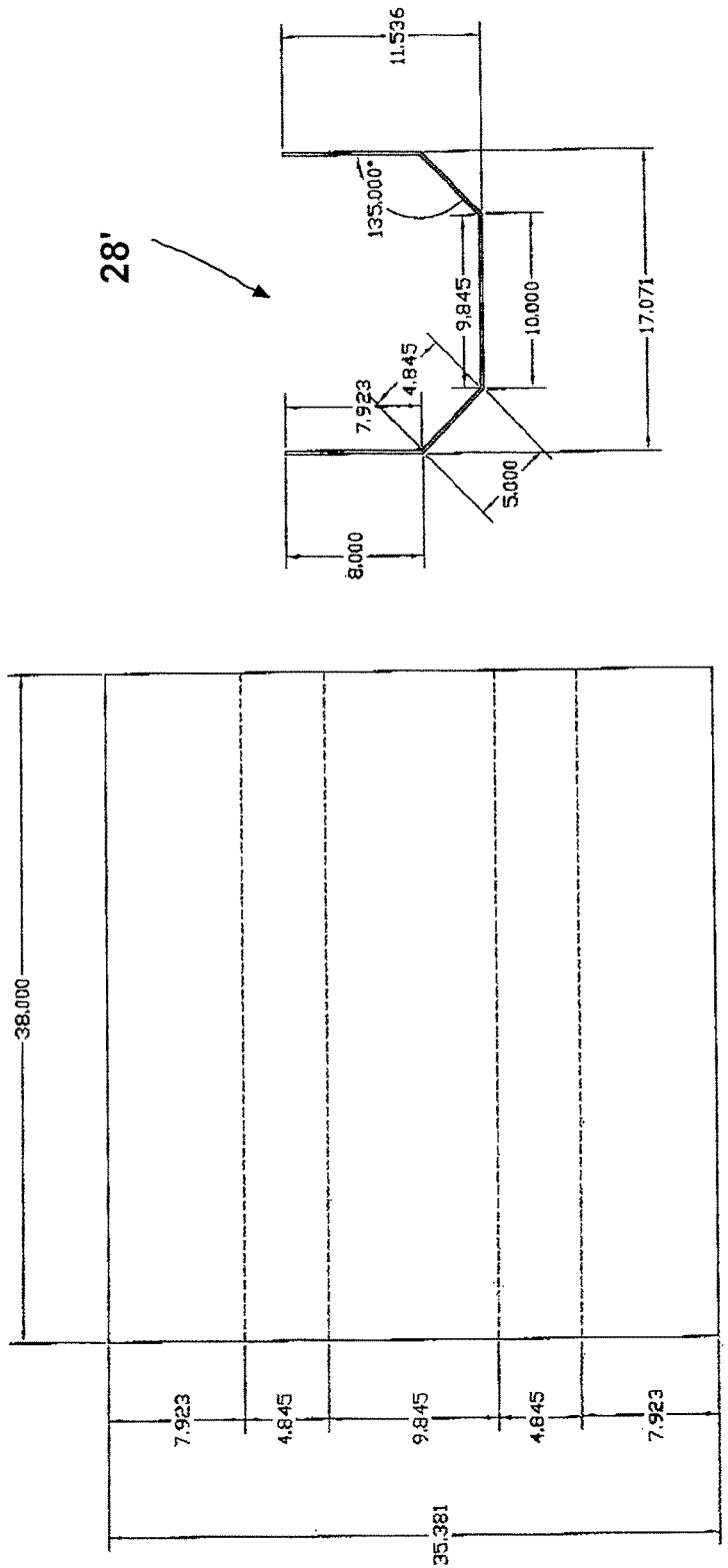
Figure 13:
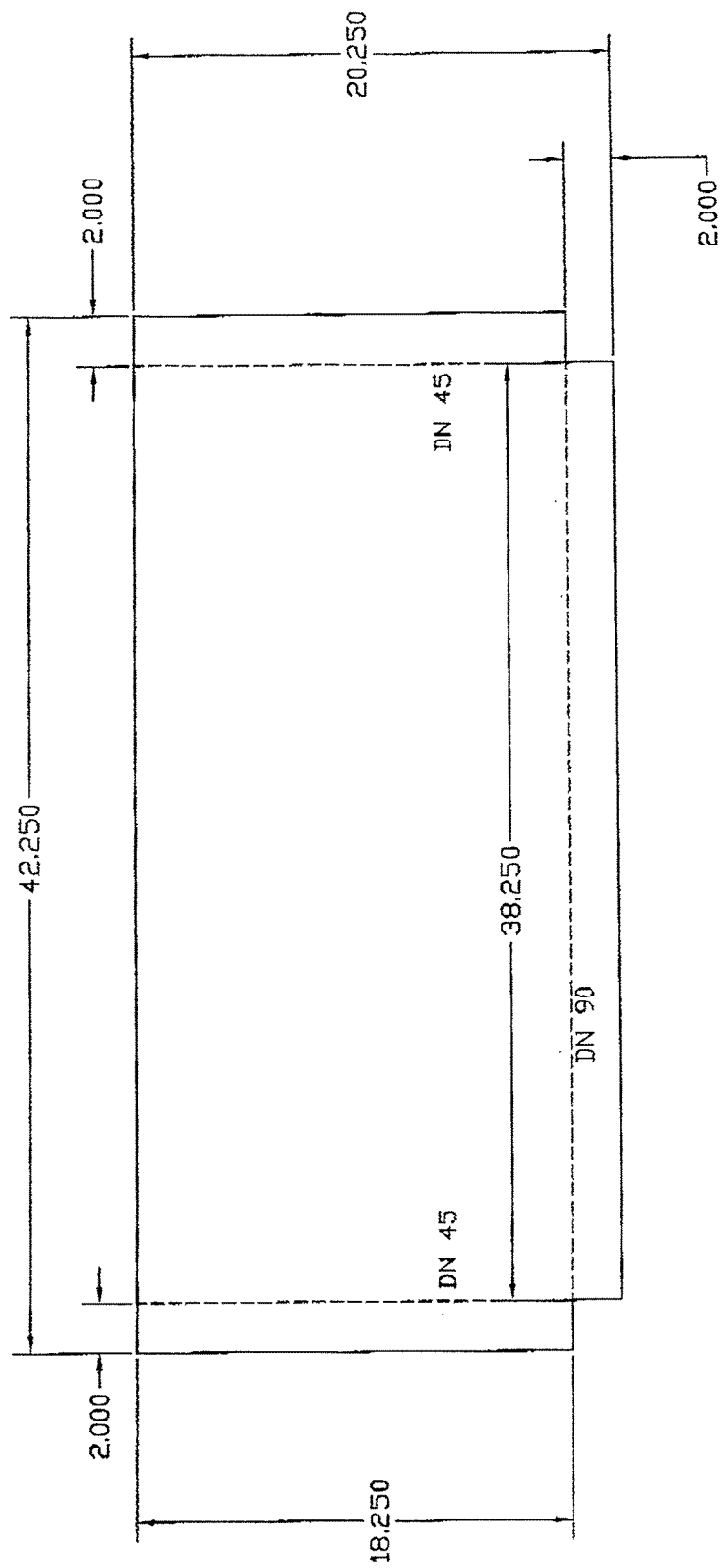

Basket 40 can be of a single section such as is shown in FIGS. 1 and 4-6. Alternatively, the basket can be a two part basket 55 as shown in FIGS. 8-10. The basket 55 has a larger section 44 and a smaller section 45 (see FIGS. 8-10). Each of the baskets 40, 55 provides a peripheral rod 56. This peripheral rod 56 connects to the upper periphery of each basket 40 or 44, 45. The peripheral rod 56 forms handles 46, 47 (see FIGS. 3-4). These handles 46, 47 enable basket 40 to be pivoted as illustrated by arrow 48 in FIG. 4 between the closed or cooking position of FIGS. 1-5 and the open or food discharge position of FIG. 7. Similarly, each of the larger and smaller baskets 44, 45 provides a peripheral rod 56.

Basket 40 includes a curved basket wall 49 and a pair of semi circular end wall 50. Similarly, each of the larger section 44 and smaller section 45 baskets provide a curved basket wall 51 and semi circular end walls 52. For the basket sections 44, 45 of FIGS. 8-10, the peripheral rod 56 can be in two parts. These parts include larger basket rod 53 and smaller basket rod 54. The basket rods 53, 54 can be connected at a sleeve or bearing or pinned connection 64, enabling either basket section 44 or 45 to be rotated as illustrated by arrow 48 in FIG. 9 and independently of the other basket section. Larger basket rod 53 thus provides handle 57. Smaller basket rod 54 provides handle 58.

Figure 6:
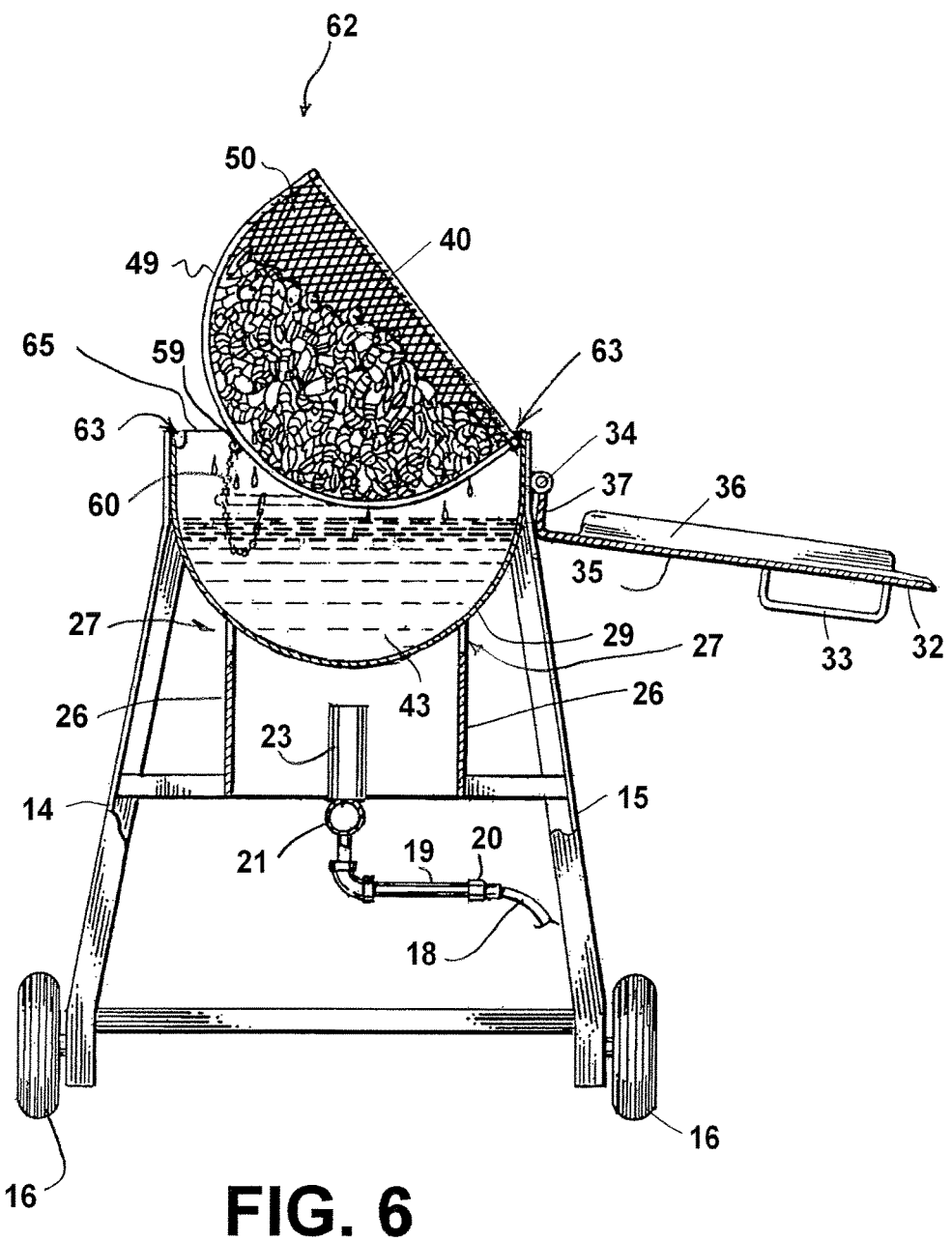
FIG. 6 is a sectional side view of the boiler of FIG. 1 showing seafood in the process of being drained from the basket.

Locking pins 59 can be provided for holding a basket 40 or a basket section 44, 45 in a draining position. This draining position 62 can be seen in FIG. 6. In order to hold the basket 40 or basket section 44, 45 in the draining position 62, locking pin 59 is placed in opening 61 which is near the top of pot or cooking vessel 28 as shown in FIG. 6. Locking pin 59 can be secured to pot or cooking vessel 28 using chain 60.

Each of the peripheral rods 56 or 53, 54 registers in a recess 63 at the upper end portion 65 of pot or cooking vessel 28 as shown in FIG. 6. To remove basket 40 or 55 from the frame 11, a user lifts vertically at handles 46, 47 (for basket 40) or 57, 58 for basket 55. When a basket 40 or 55 is lifted vertically in this fashion, it disengages from recesses 63. In order to remove a basket 40 or 55, lid 32 is placed in the open or food discharge position.

FIGS. 11-15 show an alternative pot/cooking vessel 28' with lid 32' where the cooking vessel has a plurality of planer sides (in this case five side) instead of a curved bottom. One or more baskets 40' can be shaped to similarly fit the planer shape of the pot cooking vessel 28'. Alternatively one or more baskets 40' can be rectangularly or square shaped.

In one embodiment pot cooking vessel 28 can be sloped to the drain valve. In one embodiment legs 11 can be shorter than legs 15 (or one set of legs can be collapsible or telescopically collapsible to have pot cooking vessel 28 sloped to the drain valve.

PARTS LIST

The following is a list of parts and materials suitable for use in the present invention:

| Parts Number | Description |
| --- | --- |
| 10 | cooking apparatus |
| 11 | frame |
| 12 | leg |
| 13 | leg |
| 14 | leg |
| 15 | leg |
| 16 | wheel |
| 17 | fuel supply |
| 18 | conduit/hose |
| 19 | flow line |
| 20 | coupling |
| 21 | manifold |
| 22 | burner element |
| 23 | tube |
| 24 | mounting bracket |
| 25 | mounting bracket |
| 26 | heat shield |
| 27 | vent opening |
| 28 | pot/cooking vessel |
| 29 | curved wall |
| 30 | end wall |
| 31 | flame |
| 32 | cover/lid |
| 33 | handle |
| 34 | hinge |
| 35 | larger planar section |
| 36 | retaining wall |
| 37 | smaller planar section |
| 38 | edge |
| 39 | table |
| 40 | basket |
| 41 | upper surface |
| 42 | food items |
| 43 | cooking medium/fluid |
| 44 | larger section |
| 45 | smaller section |
| 46 | handle |
| 47 | handle |
| 48 | arrow |
| 49 | curved basket wall |
| 50 | semi circular end wall |
| 51 | curved basket wall |
| 52 | semi circular end wall |
| 53 | larger basket rod |
| 54 | smaller basket rod |
| 55 | basket |
| 56 | peripheral rod |
| 57 | handle |
| 58 | handle |
| 59 | locking pin |
| 60 | chain |
| 61 | opening |
| 62 | draining position |
| 63 | recess |
| 64 | sleeve or pinned connection |
| 65 | upper end portion |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A seafood boiling apparatus, comprising:
  a) a frame that includes a cooking vessel having an interior that enables a fluid cooking medium to be contained and heated and wherein the cooking medium has an upper planar surface;
  b) one or more burners on the frame;
  c) a basket that is configured to fit the cooking vessel interior;
  d) a pivotal connection between the basket and the frame that enables the basket to be pivoted relative to the frame between cooking and food discharge positions, wherein in the cooking position the basket is located in the cooking vessel interior, and wherein in pivoting between the cooking and food discharge positions the basket pivots about a single pivot axis which single pivot axis remains fixed at a constant location;
  e) the basket being removable from the frame;
  f) a lid that is pivotally attached to the frame, the lid being movable between a cooking position that covers the entire upper planar surface of the cooking medium and an open position that rotates the lid through an obtuse angle; and
  g) wherein the basket pivotally discharges contained food items on the lid in the open position and the basket is rotated from the cooking position to the food discharge position; and wherein the basket is moved from the cooking position to the food discharge position without simultaneously moving the lid.

2. The seafood boiling apparatus of claim 1, further comprising a mechanism that locks the basket in an intermediate draining position wherein the basket is placed above the cooking medium and wherein food is retained in the basket.

3. The seafood boiling apparatus of claim 1, wherein the basket includes first and second basket storage sections, and the first storage section being pivotally connected to the second storage section such that the two storage sections can be pivoted relative to each other between the cooking and food discharge positions, and the pivotal connection between the first and second basket storage sections has a peripheral rod and the rod forms a pivotal connection with the frame.

4. The seafood boiling apparatus of claim 3, wherein the frame has multiple slots and the peripheral rod nests in the slots.

5. The seafood boiling apparatus of claim 1, wherein the lid has containment walls that contain food items on the lid when in the food discharge position, and wherein when the lid is in the cooking position, the small containment walls substantially seal the cooking vessel interior.

6. The seafood boiling apparatus of claim 1, wherein there are multiple burners which are supplied fuel via a common manifold.

7. The seafood boiling apparatus of claim 1, wherein the lid includes a large planar section and a small planar section.

8. The seafood boiling apparatus of claim 7, wherein the small planar section pivotally attached the lid to the frame, and the small planer planar section controls the maximum amount of pivoting of the lid between the closed and open positions.

9. The seafood boiling apparatus of claim 3, wherein the basket includes one or more basket handles that enable the basket to be lifted, which handles extend outside the projected planar area of the cooking medium.

10. The seafood boiling apparatus of claim 3, wherein the peripheral rod forms one or more handles that enable the basket to be pivoted.

11. The seafood boiling apparatus of claim 10, wherein the lid has containment walls that contain food items on the lid when the lid is in the food discharge position, each of the containment walls surrounded by a basket handle in the cooking position.

12. The seafood boiling apparatus of claim 11, wherein the lid has a pair of containment walls that are opposite one another, said containment walls retaining food items on the lid when in the food discharge position, each containment wall surrounded by a basket handle in the cooking position.

13. The seafood boiling apparatus of claim 1, wherein the lid has lid edges, one of the lid edges attaching to the frame with the pivotal connection, and a pair of the lid edges having a containment walls attached to the lid edges.

14. The seafood boiling apparatus of claim 1, wherein in the cooking position the lid substantially seals the cooking vessel interior.

15. The seafood boiling apparatus of claim 1, wherein the basket and lid move independently relative to each other.

* * * * *